(12) United States Patent
Hsieh

(10) Patent No.: US 8,267,525 B2
(45) Date of Patent: Sep. 18, 2012

(54) ADJUSTING SYSTEM AND PROJECTOR INCLUDING THE SAME

(75) Inventor: Ming-Chih Hsieh, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 308 days.

(21) Appl. No.: 12/848,101

(22) Filed: Jul. 31, 2010

(65) Prior Publication Data

US 2012/0002179 A1 Jan. 5, 2012

(30) Foreign Application Priority Data

Jul. 2, 2010 (TW) .............................. 99121949 A

(51) Int. Cl.
*G03B 21/00* (2006.01)
*G03B 21/14* (2006.01)
*H04N 3/23* (2006.01)
(52) U.S. Cl. ........................................ 353/70; 348/746
(58) Field of Classification Search .................... 353/69, 353/70, 101, 121, 122; 348/745, 746; 356/4.01, 356/51
See application file for complete search history.

(56) References Cited

U.S. PATENT DOCUMENTS

| 6,330,040 | B1 * | 12/2001 | Kawashima | 348/744 |
| 6,670,603 | B2 * | 12/2003 | Shimada et al. | 250/235 |
| 7,661,826 | B2 * | 2/2010 | Iwanaga | 353/69 |
| 2004/0252283 | A1 * | 12/2004 | Ogawa | 353/69 |

FOREIGN PATENT DOCUMENTS

JP 2001169211 A * 6/2001
* cited by examiner

*Primary Examiner* — William C Dowling
*Assistant Examiner* — Ryan Howard
(74) *Attorney, Agent, or Firm* — Altis Law Group, Inc.

(57) ABSTRACT

An adjusting system for a projector includes a reference point projection unit, an infrared apparatus, a micro controller unit (MCU), and a graphic processing unit (GPU). The reference point projection unit stores reference points. The reference points are projected on a screen to form projection points. The infrared apparatus includes infrared devices mounted on a front surface of a body of the projector. The infrared devices emit infrared signals to the screen and form light points on the screen. When a projection angle of the projector is 0 degrees, the light points overlap the projection points respectively. When the projection angle of the projector is a certain angle, the MCU controls the GPU to make adjustment corresponding to the infrared devices which receive the reflected infrared signals, until the projection points overlap the light points respectively.

4 Claims, 4 Drawing Sheets

ADJUSTING SYSTEM AND PROJECTOR INCLUDING THE SAME

BACKGROUND

1. Technical Field

The present disclosure relates to projectors, and particularly, to a projector including an adjusting system.

2. Description of Related Art

Projectors are widely used in a lot of places, such as offices, homes, etc. Sometimes, users need to manually adjust the projection angle of a projector, to make the projected image align with the screen. However, when the projection angle is raised past a certain angle, the image on the screen may become distorted and appear as a trapezoid shape. As a result, the image parameters need to be adjusted in the menu of the projector or by pressing other buttons on the projector, which is inconvenient and time-consuming.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
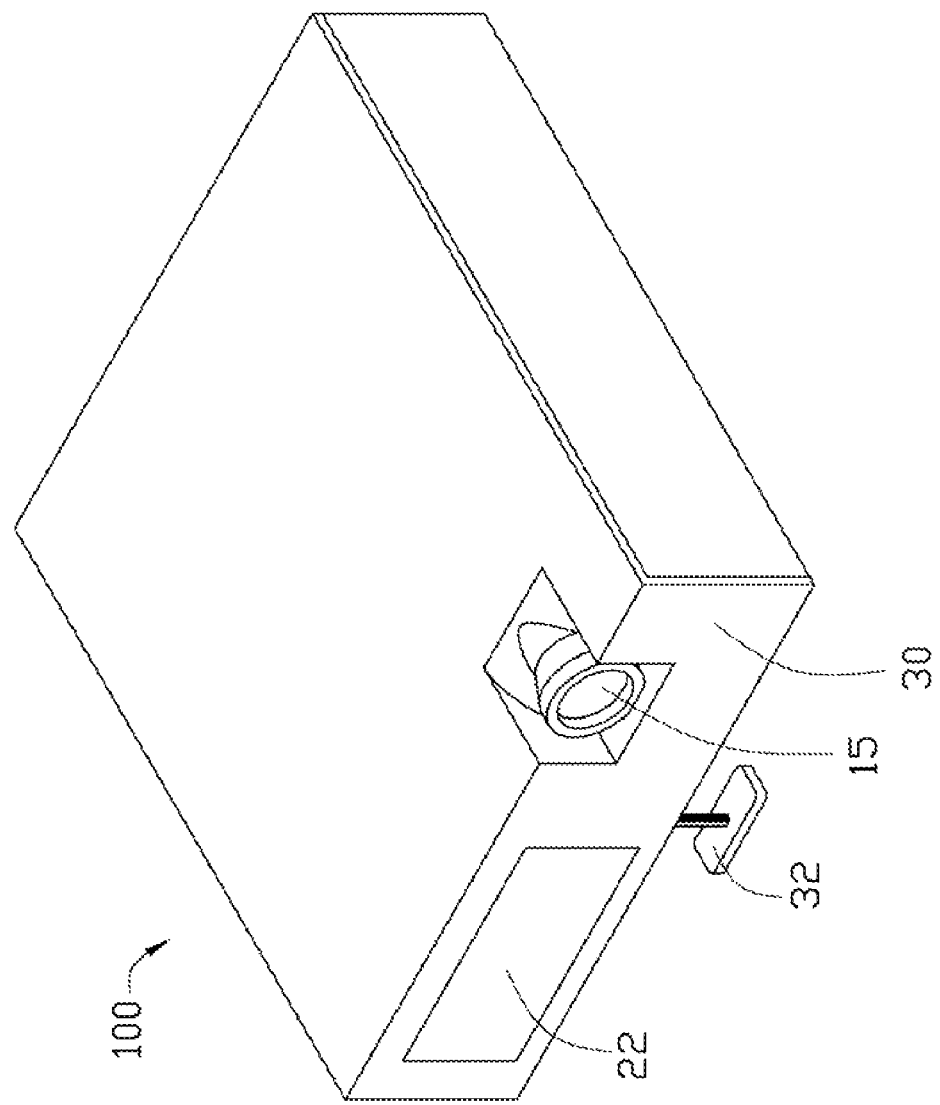
FIG. 1 is an isometric view of an exemplary embodiment of a projector.
Figure 2:
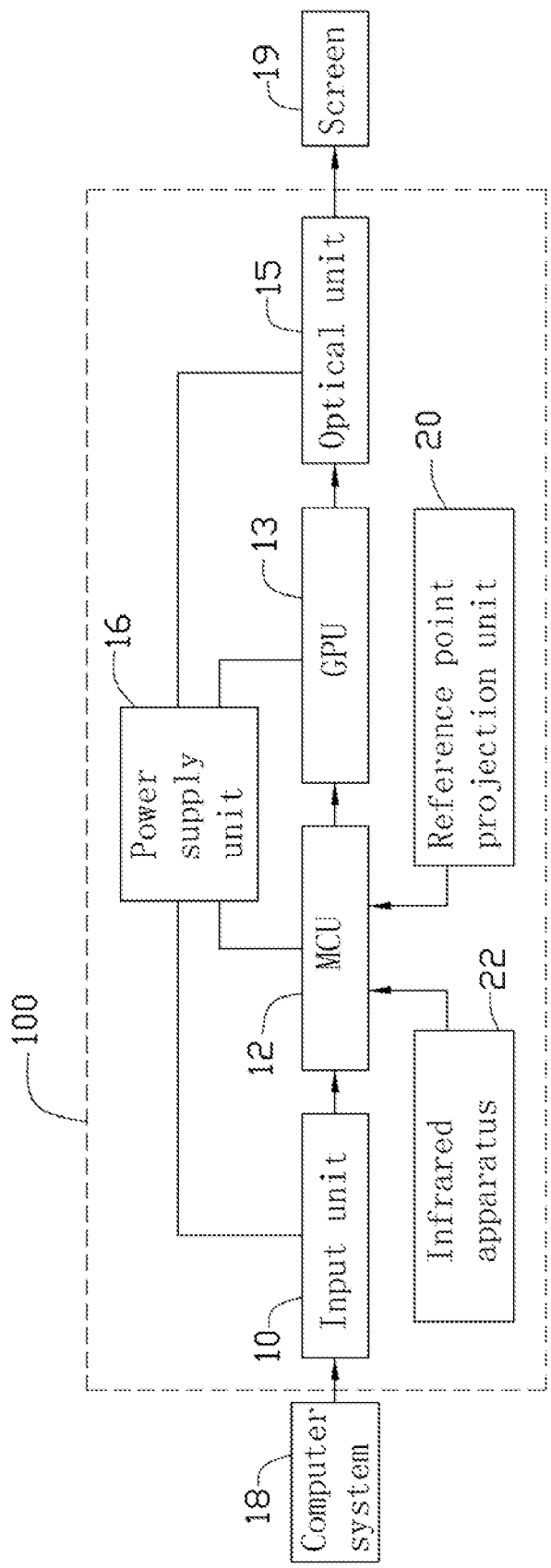
FIG. 2 is a schematic block diagram of the projector of FIG. 1, connected to a computer system, and a screen.

Referring to FIGS. 1 and 2, an embodiment of a projector 100 includes a body 30, a support shaft 32, an input unit 10, a micro controller unit (MCU) 12, a graphics processing unit (GPU) 13, an optical unit 15, a reference point projection unit 20, an infrared apparatus 22, and a power supply unit 16. The MCU 12, the reference point projection unit 20, and the infrared apparatus 22 compose an adjusting system for the projector 100.

In the embodiment, the input unit 10, the MCU 12, the GPU 13, the optical unit 15, and the power supply unit 16 are located inside the body 30 of the projector 100. The location detection unit 22 is mounted on a front surface of the body 30. The support shaft 32 is for adjusting a projection angle of the body 30.

In use, the user connects a computer system 18 to the input unit 10 of the projector 100, for transmitting images stored in the computer system 18 to the projector 100. The images are processed by the MCU 12 and the GPU 13, and then projected on a screen 19 by the optical unit 15. The power supply unit 16 provides power for the MCU 12, the GPU 13, the reference point projection unit 20, and the infrared apparatus 22. In addition, the projector 100 can include other units, such as a heat dissipation unit.

Figure 3:
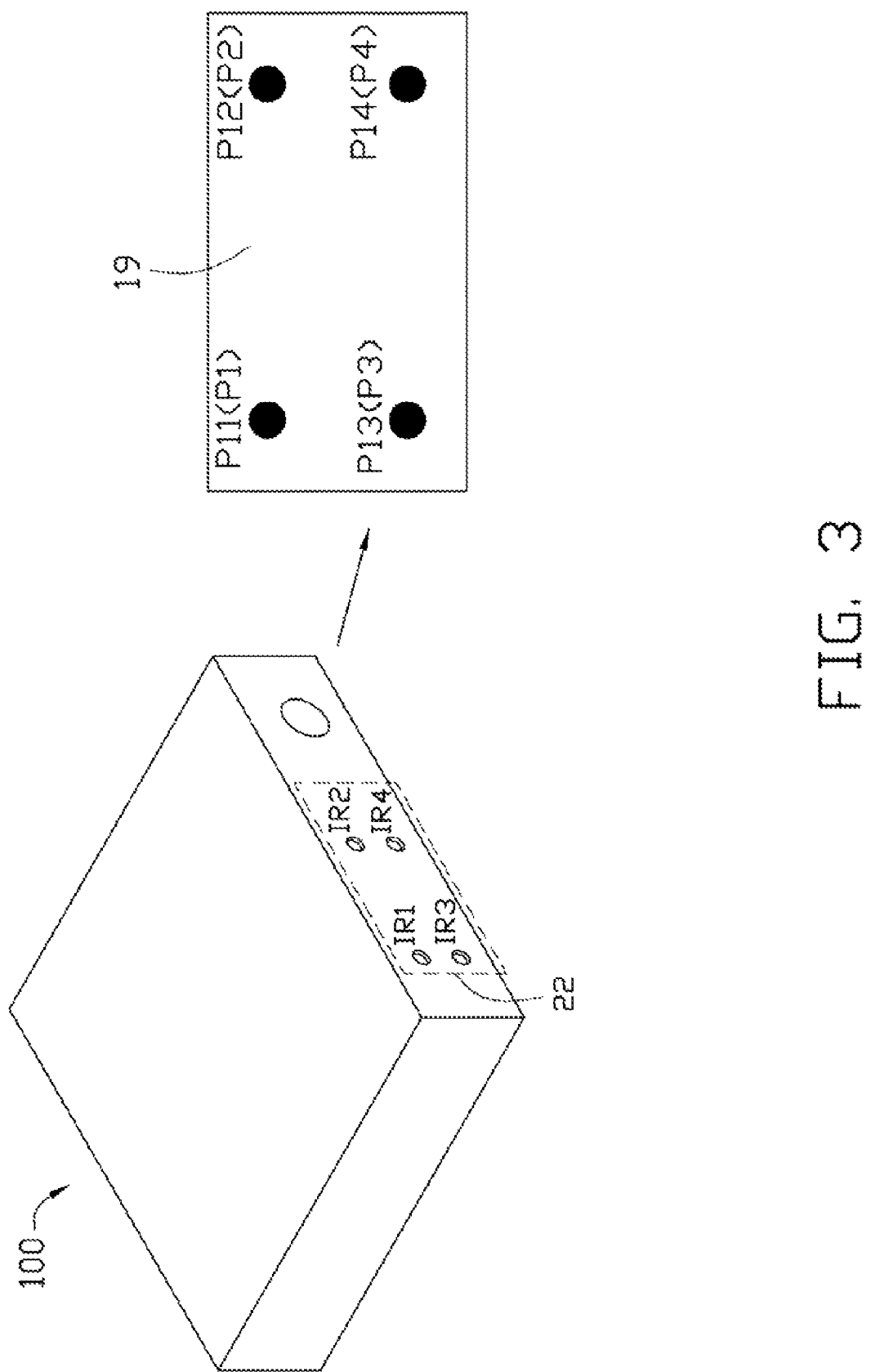
FIG. 3 is a schematic diagram of projection points and light points on the screen of FIG. 2 when a projection angle of the projector is 0 degrees.

The reference point projection unit 20 stores an image which includes four black reference points. When the projector 100 is powered on, the projector 100 projects the four black reference points on the screen 19 to form four projection points P1-P4 on the screen 19. As shown in FIG. 3, when the projection angle of the projector 100 is 0 degrees, the four projection points P1-P4 form a rectangle.

Referring to FIG. 3, the infrared apparatus 22 includes four infrared devices IR1-IR4. The four infrared devices IR1-IR4 are mounted on the front surface of the body 30, and form a rectangle. The four infrared devices IR1-IR4 emit infrared to the screen 19, and form four light points P11-P14 on the screen 19. In FIG. 3, when the projection angle of the projector 100 is 0 degrees, the infrared signals emitted from the four infrared devices IR1-IR4 impinges at the four projection points P1-P4, respectively. As a result, the four infrared devices IR1-IR4 do not receive reflected infrared signals.

Figure 4:
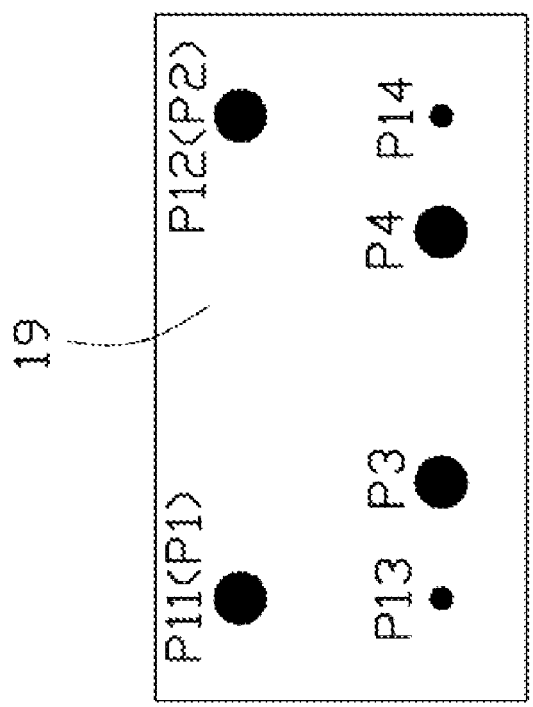
FIG. 4 is a schematic diagram showing how an image compensation function is activated according to the projection points and the light points.

Referring to FIG. 4, when the projection angle of the projector 100 is more than 0 degrees, the four projection points P1-P4 on the screen 19 form a trapezoid shape, and the four light points P11-P14 still form a rectangle shape. However, one or more of the four projection points P1-P4 will not overlap with the corresponding light points P11-P14. When the infrared signals impinge on the screen 19 but not the four black projection points P1-P4, the infrared signals are reflected back to the infrared devices Ir1-Ir4. As a result, one or more infrared devices receive reflected infrared signals.

The MCU 12 controls the GPU 13 to compensate for distortion in the projected image according to the reflected infrared signals received by the infrared devices, until the four projection points P1-P4 overlap with the four light points P11-P14, respectively. In other words, when the four infrared devices IR1-IR4 do not receive the reflected infrared signals, the MCU 12 does not control the GPU 13 to compensate for image distortion, and a non-distorted image exists.

As shown in FIG. 4, when the projection angle of the projector 100 is a certain angle, the light points P11 and P12 overlap the projection points P1 and P2 respectively, and the light points P13 and P14 do not overlap the projection points P3 and P4 respectively. As a result, the infrared devices IR1 and IR2 do not receive the reflected infrared signals, and the infrared devices IR3 and IR4 receive the reflected infrared signals.

The MCU 12 controls the GPU 13 to make adjustments for compensating distortion in the projection image. As a result, the GPU 13 processes the image stored in the reference point projection unit 20 to obtain a new image, until the four projection points P1-P4 overlap the four light points P11-P14 respectively. In the new image, the locations of the two bottom points change. The new image is projected on the screen 19, for determining whether the four projection points P1-P4 overlap the four light points P11-P14 respectively. When the four projection points P1-P4 overlap the four light points P11-P14 respectively, the MCU 12 does not control the GPU 13 to make adjustments. At this time, the GPU 13 terminates adjustment, and the trapezoid adjustment has been completed.

After the trapezoid adjustment has been completed, the GPU 13 processes images from the input unit 10. The processed images are projected on the screen 19, and would not form a trapezoid shape.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. An adjusting system for a projector, the adjusting system comprising:
 a reference point projection unit storing a plurality of reference points to be projected on a screen to form a plurality of projection points;
 an infrared apparatus, wherein the infrared apparatus comprises a plurality of infrared devices mounted on a front surface of a body of the projector, the plurality of infrared devices emits infrared signals to the screen and form a plurality of light points on the screen, when a projection angle of the projector is 0 degrees, the plurality of light points overlap the plurality of projection points respectively;
 a micro controller unit (MCU);
 a graphic processing unit (GPU), wherein when the projection angle of the projector is a certain angle larger than 0 degrees, the MCU controls the GPU to make adjustment corresponding to the infrared devices which receive the reflected infrared signals, until the plurality of projection points overlap the plurality of light points respectively.

2. The adjusting system of claim 1, wherein the infrared apparatus comprises four infrared devices, the reference point projection unit stores four black reference points, the four black reference points are projected on the screen to form four black projection points.

3. A projector comprising:
 a body;
 an input unit for receiving images;
 a micro controller unit (MCU);
 a graphic processing unit (GPU);
 an optical unit;
 a reference point projection unit storing a plurality of reference points, wherein the reference points are processed by the MCU and the GPU, and then projected on a screen to form a plurality of projection points by the optical unit; and
 an infrared apparatus, wherein the infrared apparatus comprises a plurality of infrared devices mounted on a front surface of a body of the projector, the plurality of infrared devices emits infrared signals to the screen and form a plurality of light points on the screen, when a projection angle of the projector is 0 degrees, the plurality of light points overlap with the plurality of projection points respectively; wherein when the projection angle of the projector is a certain angle larger than 0 degrees, the MCU controls the GPU to make adjustment corresponding to the infrared devices which receive the reflected infrared signals, until the plurality of projection points overlap with the plurality of light points respectively.

4. The projector of claim 3, wherein the infrared apparatus comprises four infrared devices, the reference points projection unit stores four black reference points, the four black reference points are projected on the screen to form four black projection points.

* * * * *